(12) United States Patent
Xiong (10) Patent No.: US 7,975,092 B2
(45) Date of Patent: Jul. 5, 2011

(54) BUS INTERFACE CONVERTER CAPABLE OF CONVERTING AMBA AHB BUS PROTOCOL INTO I960-LIKE BUS PROTOCOL

(75) Inventor: Xiaokun Xiong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1110 days.

(21) Appl. No.: 10/583,397

(22) PCT Filed: Dec. 18, 2003

(86) PCT No.: PCT/CN03/01085
§ 371 (c)(1),
(2), (4) Date: Apr. 20, 2007

(87) PCT Pub. No.: WO2005/059765
PCT Pub. Date: Jun. 30, 2005

(65) Prior Publication Data
US 2007/0198762 A1    Aug. 23, 2007

(51) Int. Cl.
*G06F 13/36*  (2006.01)
*G06F 13/42*  (2006.01)
*G06F 1/00*   (2006.01)

(52) U.S. Cl. ........ 710/315; 710/100; 710/105; 710/306; 713/300; 713/320; 713/323; 370/257

(58) Field of Classification Search ................. 710/306, 710/315; 340/825; 370/257
See application file for complete search history.

(56) References Cited

U.S. PATENT DOCUMENTS

| | | | | |
|---|---|---|---|---|
| 5,603,051 A | * | 2/1997 | Ezzet | 710/2 |
| 6,065,087 A | * | 5/2000 | Keaveny et al. | 710/315 |
| 6,112,241 A | * | 8/2000 | Abdelnour et al. | 709/224 |
| 6,122,670 A | * | 9/2000 | Bennett et al. | 709/236 |
| 6,161,161 A | * | 12/2000 | Botkin et al. | 710/313 |
| 6,442,642 B1 | * | 8/2002 | Brooks | 710/305 |
| 6,571,308 B1 | * | 5/2003 | Reiss et al. | 710/315 |
| 6,789,153 B1 | * | 9/2004 | Stewart | 710/306 |
| 6,829,669 B2 | * | 12/2004 | Jahnke et al. | 710/306 |
| 6,996,659 B2 | * | 2/2006 | Lupien et al. | 710/315 |
| 7,165,184 B2 | * | 1/2007 | Fuks | 713/400 |

FOREIGN PATENT DOCUMENTS

WO    WO 97/36244    10/1997

OTHER PUBLICATIONS

ARM—"AMBA Specification Revision 2.0"—230 pages; Dated 1999.*  BaBar Electronics—"BaBar DAQ System—PCI Mezzanine Card, i960 Signals"—6 pages; Dated Mar. 5, 1997.*
Intel—"Intel i960 Processors"—4 pages; Dated 2002.*
"The i960CA SuperScalar Implementation of the 80960 Architecture"—9 pages; Dated 1990.*
"Design and Implementation of the STAR Experiment's DAQ"—6 pages; No Date Provided.*

* cited by examiner

*Primary Examiner* — Brian T Misiura
(74) *Attorney, Agent, or Firm* — Hamre, Schumann, Mueller & Larson, P.C.

(57) ABSTRACT

The invention provides a bus interface converter for converting from AMBA AHB bus protocol to i960-like bus protocol. The converter comprises an AHB interface which can accomplish interface processing for AMBA AHB bus protocol; an i960-like interface which can accomplish interface processing for i960-like bus protocol; and a main controller which can accomplish protocol converting between the AHB interface and the i960-like interface, wherein the AHB interface comprises an AHB bus signal register module which can judge and register control signal from AMBA AHB bus; and an AHB bus signal response module which can generate corresponding response indicating signal of AMBA AHB bus protocol.

12 Claims, 6 Drawing Sheets

Figure 3-3 Simple transfer

FIG 1

Figure 3-4 Transfer with wait states

FIG 2

Figure 3-5 Multiple transfers

Figure 3-14 Error response

BUS INTERFACE CONVERTER CAPABLE OF CONVERTING AMBA AHB BUS PROTOCOL INTO I960-LIKE BUS PROTOCOL

FIELD OF THE INVENTION

The present invention relates to the design of digital interface conversion in the field of integrated circuit design, and particularly relates to a bus interface converter capable of converting AMBA AHB bus protocol into i960-like bus protocol in the field of ARM embedded microprocessor application-based design.

BACKGROUND OF THE INVENTION

In the field of integrated circuit, every chip or device has its communication interface with the outside. Because of technical, market and other historical reasons, various chips or devices comply with different protocol standards or bus specifications. When chips or devices with different interfaces need to be interconnected for communication, the interface conversion or protocol conversion becomes an inevitable step. While the provider of the embedded CPU core, ARM Inc. rises in the field of RISC microprocessor as a new force, the AMBA AHB bus protocol with its inherent advantages has become more and more popular in the industry. AMBA AHB bus protocol, as an open standard, has already become the actual standard for the construction of on-chip system SoC and the development of IP library. i960 is a series of microprocessors provided by Intel Company for the embedded applications, and there are a lot of interface devices right now based upon i960 or i960-like bus interface protocol. At present, in the industry, there is already interface bus protocol converting bridge for converting from PCI protocol into i960 (or i960-like), but till now there is no converting controller for converting interface bus protocol from AMBA AHB into i960-like, which also supports both synchronous and asynchronous modes.

Figure 1:
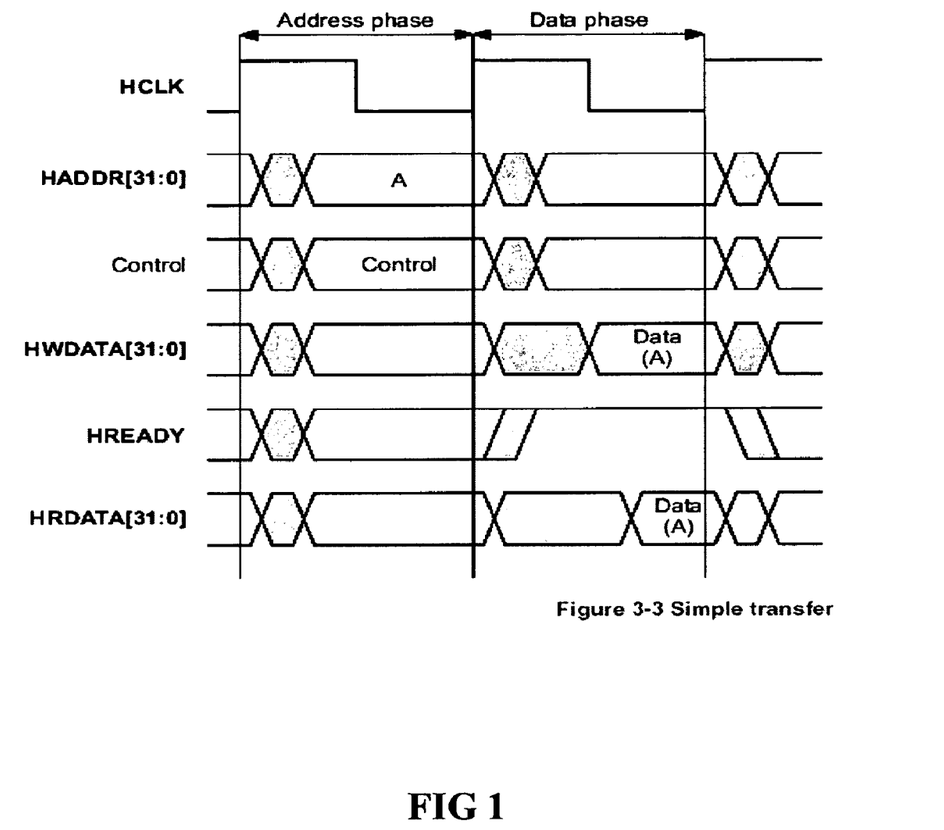
FIG. 1 is a basic read/write sequence diagram of AMBA AHB bus.
Figure 2:
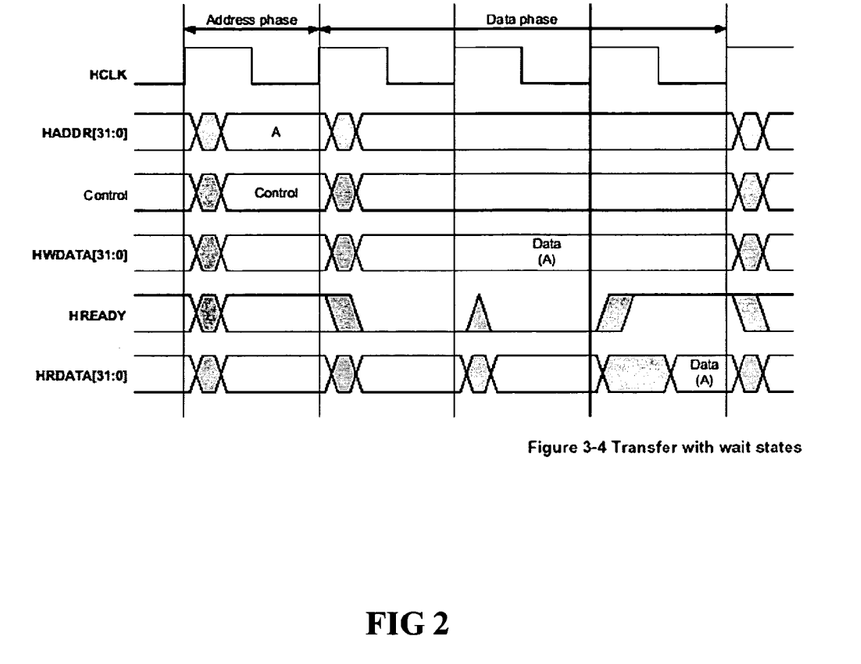
FIG. 2 is a read/write sequence diagram of AMBA AHB, including wait state.
Figure 3:
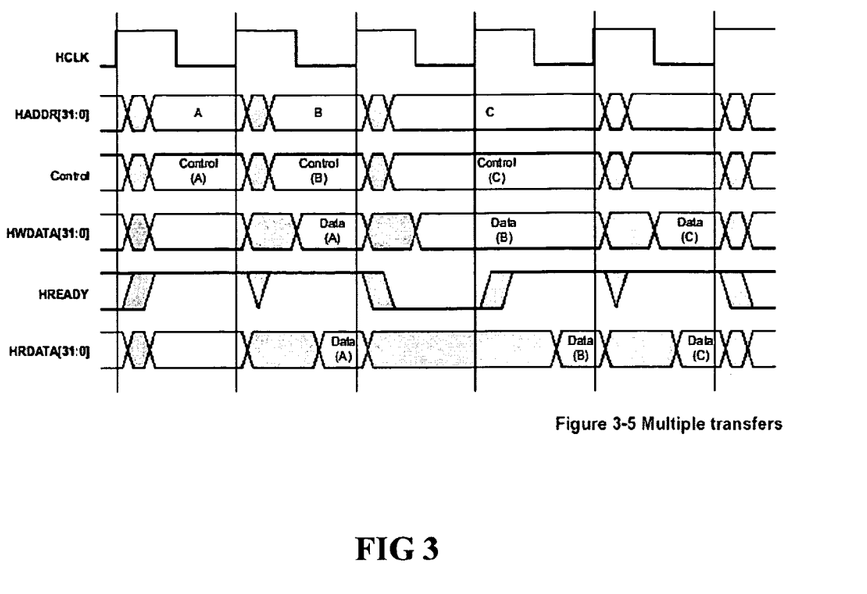
FIG. 3 is a read/write sequence diagram of AMBA AHB, including several consecutive read/write periods.
Figure 4:
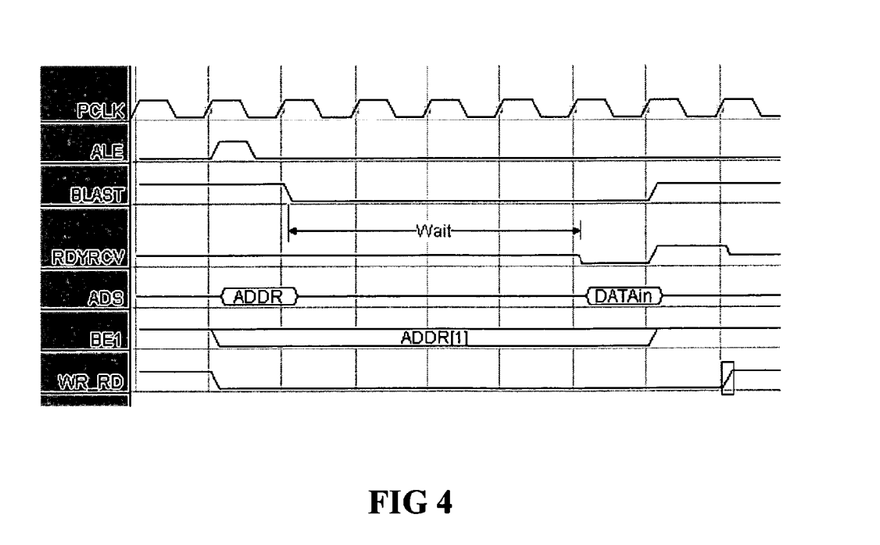
FIG. 4 is a sequence diagram for read operation of i960-like bus.
Figure 5:
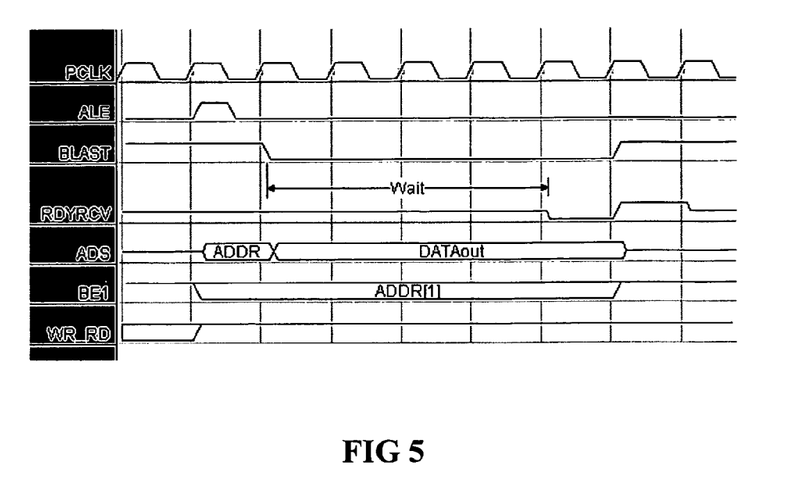
FIG. 5 is a sequence diagram for write operation of i960-like bus.

FIGS. 1, 2 and 3 illustrate the basic transfer methods of AMBA ALB bus protocol, wherein, FIG. 1 illustrates the most basic read/write situation; FIG. 2 illustrates the case which includes wait state; and FIG. 3 illustrates several consecutive read/write actions. FIGS. 4 and 5 illustrate the i960-like bus protocol, wherein FIG. 4 is read operation and FIG. 5 is write operation.

SUMMARY OF THE INVENTION

The object of the present invention is to provide a bus interface converter capable of converting AMBA AHB bus protocol into i960-like bus protocol, so as to accomplish the conversion from AMBA AHB bus to i960-like bus, and support two operation modes in which the AMBA AHB bus and i960-like bus operate synchronously and asynchronously.

In order to achieve the above object, the present invention adopts the following technical solution:

A bus interface converter capable of converting AMBA AHB bus protocol into i960-like bus protocol, comprising: an AHB interface for accomplishing interface processing for AMBA AHB bus protocol; an i960-like interface for accomplishing interface processing for i960-like bus protocol; and a main controller for accomplishing the bus protocol conversion between the AHB interface and the i960-like interface. Wherein, the AHB interface comprises: an AHB bus signal register module for judging and registering control signal from AMBA AHB bus; and an AHB bus signal response module for generating corresponding response indicating signal of AMBA AHB bus protocol; the i960-like interface comprises: a bus interface multiplexing request module for generating bus interface multiplexing request signal; and a bus multiplexing module for accomplishing the multiplexing between the address output bus from AHB to i960-like and the data output bus from AHB to i960-like.

Preferably, the AHB bus signal register module further comprises an AHB bus write buffer module for buffering write data and write address from the AHB bus, the AHB bus write buffer module comprises two fields: address field and data field; the AHB bus write buffer module comprises an enabling port, which can configure the size of the address field and data field of the AHB bus write buffer module via AHB bus.

Preferably, the AHB bus signal response module is used to generate AMBA AHB bus feedback signals HREADYout and HRESP.

Preferably, the i960-like interface has the function of accessing the outside bus request and response, which can be connected to a bus interface multiplexing controller and then connected to i960-like bus after bus multiplexing; the i960-like interface can also be connected with i960-like bus directly.

Preferably, the bus interface multiplexing request module is configured to determine whether or not to send bus request signal to the bus interface multiplexing controller based on the status indicating signal from the main controller, and to determine whether or not to stop sending bus request signal to the bus interface multiplexing controller based on the response signal from i960-like bus.

Preferably, the address and data multiplexing output bus of the bus multiplexing module is connected to the top interconnected logic module, and multiplexed with ADS-IN signal into a tri-state dual-direction address data bus signal through tri-state gate.

Preferably, the main controller has two clocks which are synchronous with AHB bus clock and i960-like bus clock respectively.

Preferably, the clock frequency of the AHB bus may be N times of that of the i960-like bus, where N is a natural number no less than 1.

Preferably, the main controller has a state machine for indicating the current state of the main controller, which may have three kinds of states: idle, read, and write.

Preferably, the clock of the i960-like interface can be configured into normal mode or low-power mode; in the low-power mode, the clock of the i960-like interface is dynamically controlled by the bus request signal sent by the bus interface multiplexing request module. When there is communication between AHB bus and i960-like bus, the clock of the i960-like interface is valid; while when there is no communication between AHB bus and i960-like bus, the bus clock of the i960-like interface is set to be "1" state to suspend.

The bus interface converter capable of converting AMBA AHB bus protocol into i960-like bus protocol according to the present invention adopts the technology of supporting both synchronous and asynchronous clocks, which enables the frequency of AMBA AHB bus clock to be N times of the frequency of the i960-like bus clock (N is a natural number no less than 1), so that the capability of the CPU core at the side of the AHB bus can be fully carried out and utilized, without being fully limited by the clock frequency at the side of the i960-like interface.

BRIEF DESCRIPTION OF THE DRAWINGS

The above features, advantages and objects of the present invention will be more clearly understood from the following detailed description taken in conjunction with the accompanying drawings, in which.

DETAILED DESCRIPTION OF THE PREFERRED EMBODIMENT

Hereunder, the preferred embodiments of the present invention will be described in detail with reference to the accompanying drawings.

FIG. 1 is a basic read/write sequence diagram of AMBA AHB bus, wherein AMBA AHB bus is two pipelines operation.

FIG. 2 is a read/write sequence diagram of AMBA AHB bus, including wait state. As shown in FIG. 2, when the HREADY signal is low, the values of control signal and data bus remain the previous value, until HCLK clock signal receives that the HREADY signal becomes high.

FIG. 3 is a read/write sequence diagram of AMBA AHB, including several consecutive read/write periods. It is obvious from FIG. 3 that AMBA AHB bus is two pipelines operation, and it can also be learned that there is not necessarily any IDLE state as transition between two successive operations.

FIG. 4 is a sequence diagram for read operation of i960-like bus. As seen From FIG. 4 that when ALE signal is valid (high), the width of signal is half of PCLK clock period; BLAST signal is the chip selection signal, which can be expanded as per the actual request, so as to determine the number of i960-like interfaces carried by the bus interface converter capable of converting AMBA AHB bus protocol into i960-like bus protocol according to the embodiment of the present invention; RDYRCV signal is a tri-state input signal in the embodiment of the present invention, which is valid when being low, and such signal needs pull-up resistor when connecting with the chip pin, otherwise, this embodiment cannot work well; wait periods are determined by the time when the other end of i960-like bus returns RDYRCV signal; ADS signal is tri-state data address bus, wherein, the ADDR marked thereon is output address bus signal in this embodiment, while the following DATAin is input data bus signal in this embodiment; BE1 signal is the first bit of the ADDR address bus, i.e. ADDR[1].

FIG. 5 is a sequence diagram for write operation of i960-like bus. As seen From FIG. 5 that when ALE signal is valid (high), the width of signal is half of PCLK clock period; BLAST signal is the chip selection signal, which can be expanded as per the actual request, so as to determine the number of i960-like interfaces carried by the embodiment of the present invention; RDYRCV signal is a tri-state input signal with respect to the embodiment of the present invention, which is valid when being low, and such signal needs pull-up resistor when connecting with the chip pin, otherwise, this embodiment cannot work well; wait periods are determined by the time when the other end of i960-like bus returns RDYRCV signal; ADS signal is tri-state data address bus, wherein, the ADDR marked thereon is output address bus signal with respect to this embodiment, while the following DATAout is input data bus signal in this embodiment; BE1 signal is the first bit of the ADDR address bus, i.e. ADDR[1].

Figure 6:
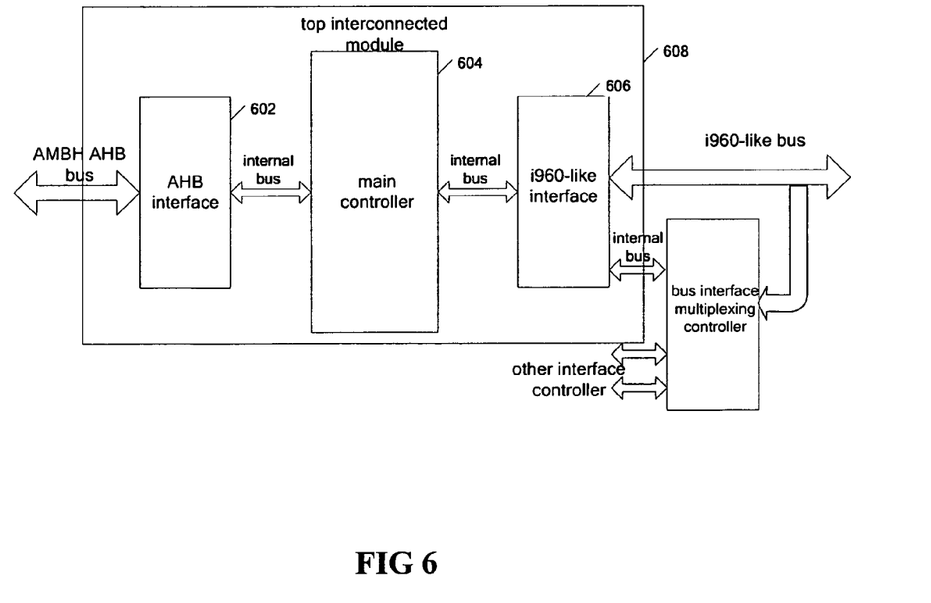
FIG. 6 is a system functional-block diagram of the bus interface converter capable of converting AMBA AHB bus protocol into i960-like bus protocol according to an embodiment of the present invention.

FIG. 6 is a system functional-block diagram of the bus interface converter capable of converting AMBA AHB bus protocol into i960-like bus protocol according to the embodiment of the present invention. As is shown in FIG. 6, the bus interface converter capable of converting AMBA AHB bus protocol into i960-like bus protocol in the present embodiment comprises the following functional parts:

AHB interface 602: one side of the AHB interface is connected with AMBA AHB bus, acting as an AHB SLAVE interface, which is precisely in conformity with AMBA V2.0 specification, and the other side thereof is connected with the main controller;

Main controller 604: the main controller accomplishes the most part of protocol conversion;

i960-like interface 606: one side of i960-like interface is connected with the main controller, while the other side is connected with the i960-like bus. It is to be noted that the i960-like interface has the function of requesting for visiting outside bus and responding. That means it can either directly connect to i960-like bus, or conduct the bus multiplexing with other interface controller before connecting to i960-like bus in order to achieve the goal of saving the chip pin resources and reducing the cost. The two different connection manners increase the flexibility in practice.

Top interconnected logic module 608 combines the above functional parts together to complete the packaging of the module, and also to complete the multiplexing between the output bus for outputting from AHB to i960-like and the input bus for inputting from i960-like to AHB.

Figure 7:
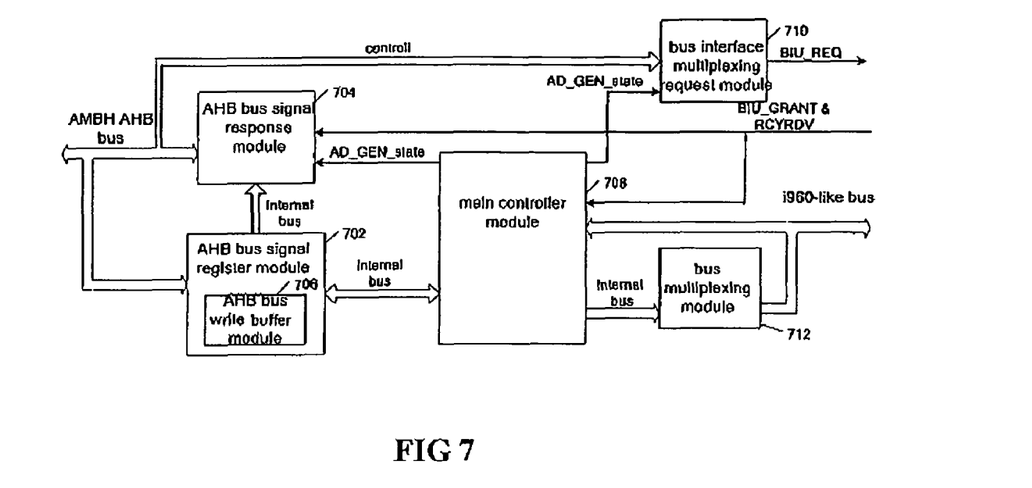
FIG. 7 is a block diagram of the bus interface converter capable of converting AMBA AHB bus protocol into i960-like bus protocol according to an embodiment of the present invention.

FIG. 7 is a block diagram of the bus interface converter capable of converting AMBA AHB bus protocol into i960-like bus protocol in the embodiment of the present invention. As is shown in FIG. 7, the bus interface converter for converting AMBA AHB bus protocol into i960-like bus protocol according to the present embodiment comprises five functional primary sub-modules and one secondary submodule. Wherein, The modules for accomplishing the AHB interface function comprises:

AHB bus signal register module 702, which serves to conduct judgment and register for the control signals from AMBA AHB bus;

AHB bus signal response module 704, which serves to produce the corresponding response instruction signal of AMBA AHB bus protocol;

Wherein, AHB bus signal register module 702 further comprises:

AHB bus write buffer module 706, which serves to conduct buffering for the write data and write address from AHB bus;

Accomplishing the function of the main controller comprises: main controller module 708, which conducts the most part of protocol conversion;

The modules for accomplishing i960-like interface functions comprise:

Bus interface multiplexing request module 710, which serves to produce bus interface multiplexing request signals;

Bus multiplexing module 712 serves to conduct the multiplexing between the address bus for outputting from AHB to i960-like and the data bus for outputting from AHB to i960-like.

The detailed functions, construction and interconnection of each of the said modules are as follows:

AHB bus signal register module 702 of the AHB interface serves to conduct judgment on the control signals from AMBA AHB bus (HTRANS, HSEL, HREADY_IN) to determine whether there is accessing instruction from AMBA AHB bus; after it is determined that there is accessing instruction from AMBA AHB bus, register the control signal and address signal from AMBA AHB bus. In case the accessing from AMBA_AHB is write operation, a write indicating signal with one clock period width is produced, then check the write buffer field of the system, if the write buffer is enabled, then store the registered address and the corresponding write data into write buffer module; then decode the address signal as per actual request, and produce the internal signal for creating the BLAST signal corresponding to i960-like bus protocol.

The depth C_DEPTH of AHB bus write buffer module 706 can be set by AHB bus, and the set value shall be the mathematic power of 2, with the maximum of 128. There are two buffer fields in all, which are address field and data field respectively. The clocks for writing into and reading out of the buffer both adopt the synchronous clock of AHB bus. The write buffer has the output of full mark FifoFull and empty mark FifoEmpty. AHB bus signal register module 702 controls the write buffer module 706, as long as the empty mark FifoEmpty of the write buffer is low, i.e. there is write data to be converted in the write buffer, the AHB bus signal register module 702 will automatically produce a read instruction of one clock period, and send the data from the write buffer to the main controller module 708 for bus protocol converting transmission, wait until the received signal RDYRCV_reg of i960-like bus (register the RDYRCY signal for one period by using i960-like bus clock) is low, then produce the next read instruction for reading data from the write buffer to the main controller module 708, until the empty mark FifoEmpty of the write buffer becomes high, i.e. there is no write data to be converted in the write buffer. The write buffer module 706 has an enabling port, which can be configured by AHB bus. When the write buffer module 706 is configured to be invalid, the write data is directly sent to the main controller module 708, while the write buffer is bypassed.

The AHB bus signal response module 704 of AHB interface conducts the generation of AMBA AHB bus response signal HREADYout and HRESP. Wherein, the HREADYout signal is composed of two signals, NONHSIZE_HREADYout and HSIZE_HREADYout; the creation logic of NONHSIZE_HREADYout is: conducting judgment and determination to the control signal (HTRANS, HSEL, HREADY_IN) from AMBA AHB bus. Firstly, determine there is accessing instruction from AMBA_AHB bus and judge whether it is read operation or write operation, if it is read operation, then immediately pull down the NONHSIZE_HREADYout signal; if it is write operation, then judge the status of write buffer sent by AHB bus signal register module 702, if the write buffer enables and is not full, then set the NONHSIZE_HREADYout signal high, if the write buffer does not enable or enables but already full, then pull down the NONHSIZE_HREADYout signal. Then, conduct judgment and determination to the RDYRCV signal from i960-like bus and the AD_GEN_wrbusy_reg signal from the main controller module 708 (whose creating mechanism will be described later in the part for main controller module), if the write operation of AHB bus causes the NONHSIZE_HREADYout signal to become low, then pull up the NONHSIZE_HREADYout signal after determining that AD_GEN_wrbusy_reg signal is low, i.e. is idle and at the same time, RDYRCV signal becomes low to be valid, then all data in the write buffer have been converted and the write buffer is in idle state, while the data read from i960-like has already been converted and transmit to AHB read bus; in case the write operation of the AHB bus causes the NONHSIZE_HREADYout signal to become low, if the write buffer is in enable state, pull up the NONHSIZE_HREADYout signal after the signal showing write buffer is in full state changes from high to low, and when the write buffer does not enable, pull up the NONHSIZE_HREADYout signal after determining that the RDYRCV signal from i960-like bus becomes low and valid. The HSIZE_HREADYout produce the wait state with two clock periods in case there is HSIZE error, which is then combined with NONHSIZE_HREADYout through logic AND into the signal HREADYout, forming the wait state with two clock periods, so as to conform to the AMBA AHB bus protocol standard under such situation (See FIG. 8); HRESP signal normally returns OKAY response, and returns ERROR response only when HSIZE does not show the required bit width access, while its sequence conforms to the AMBA AHB bus protocol standard under such situation (See FIG. 8);

The bus interface multiplexing request module 710 of the i960-like interface judges whether write buffer enables, if the write buffer does not enable, then sends bus request signal REQUEST_BIU to the bus interface multiplexing controller (Bus Interface Unit) upon determining there is accessing instruction (including read and write operation instructions) from AMBA_AHB bus, then judge and detect the control signal HREADY_IN from AMBA_AHB bus, if it is detected that HREADY_IN is in logic high level, then stop sending bus request signal REQUEST_BIU to the bus interface multiplexing controller BIU; if the write buffer enables, then send bus request signal REQUEST_BIU to bus interface multiplexing controller BIU when determine that the state indicating signal AD_GEN_state from the main controller indicates read or write, then judge and detect the RDYRCV_reg signal from the i960-like bus, if it is detected that signal RDYRCV_reg is in logic low level, then stop sending bus request signal REQUEST_BIU to the bus interface multiplexing controller BIU. If the present embodiment does not multiplex with other similar bus interface controller, but directly connects to the i960-like bus, then the input signal GRANT_BIU which is from the bus interface multiplexing controller BIU should be set to be valid constantly, i.e. in logic high level, so that the converter's operation will not be affected by the bus request signal REQUEST_BIU from this module; in addition, it is able to take the bus request signal REQUEST_BIU from this module as control signal according to the initial configuration information from the AHB bus, so as to dynamically control the i960-like bus clock output from this interface converter; when there is communication from AHB to i960-like, the i960-like bus clock is valid, when there is no communication, then automatically set the i960-like bus clock high and suspend, so as to save the power of the chip or module connected to the present embodiment via the i960-like bus.

The main controller module 708 serves the functions of the most part of protocol converting, conducts the logic and sequence converting of the registered AMBA AHB bus control signal, generate the internal control signal for controlling the i960-like bus protocol signal, because according to i960-like bus protocol, not only the data and the address bus are multiplexed in the same bus, but also the input and output are multiplexed in the same bus, and it shall also be considered that AMBA AHB bus clock and i960-like bus clock synchronous and asynchronous (i.e. N times of frequency) convert, all these factors lead to that the sequence of controller signal must be strict, otherwise there may be bus conflict or unstable logic; there is a state machine in the main controller module 708, including three states: idle (IDLE), read (READ_STATE) and write (WRITE_STATE). The state indicating signal AD_GEN_state indicates IDLE, READ_STATE or WRITE_STATE. Once there is read/write instruction from the AHB bus signal register module 702, the state machine changes from IDLE to READ_STATE or WRITE_STATE; once it is detected that the signal RDYRCV_reg from i960-like bus is low, the state means then changes from READ_STATE or WRITE_STATE to IDLE. There is always IDLE between one READ_STATE or WRITE_STATE and the next READ_STATE or WRITE_STATE, this is for the purpose of preventing continuous occupying outside shared bus when multiplexing bus with other interface controller through the bus interface multiplexing controller BIU, so as to enable other possible AHB SLAVE module with higher priority to promptly obtain the use right of outside bus. The priority of entering into WRITE_STATE from IDLE is higher than that of entering into READ_STATE from IDLE, so as to ensure that when write buffer enables, read operation is always completed when the write buffer is empty, i.e. if there is data in write buffer, the read operation from AHB needs to wait until all data in the write buffer have been converted, then conduct read conversion. Such measure is to maintain the consistency of read and write data. When the state machine is in WRITE_STATE, AD_GEN_wrbusy signal is high, and use i960-like bus clock to register this signal for one period to generate AD_GEN_wrbusy_reg signal which inputs to the AHB bus signal response module 704. This module adopts two clocks, synchronous to AHB bus clock and i960-like bus clock respectively. The state machine's logic uses AHB bus clock, while use i960-like bus clock to generate internal control signals for controlling the i960-like bus protocol signals. When these two clocks are asynchronous, at the logic joining position of these two clocks domains, adopt the measure of the low frequency clock domain logic of i960-like bus synchronous with the high frequency clock of AHB bus to achieve being synchronous.

The bus multiplexing module 712 of the i960-like interface serves the multiplexing function of output address bus and output data bus, the control signal of which is the control signal AD_ADDNOTDATA (indicating address when high, and indicating data when low) generated by the main controller; the generated address and data multiplexing output bus ADS_OUT is connected to the top module of this embodiment, multiplexing with ADS_IN signal through tri-state gate to become tri-state dual-direction address and data bus signal ADS, the control signal of which is the control signal AD_OUT_EN (indicating output when high, and indicating input when low) generated by the main controller.

Figure 8:
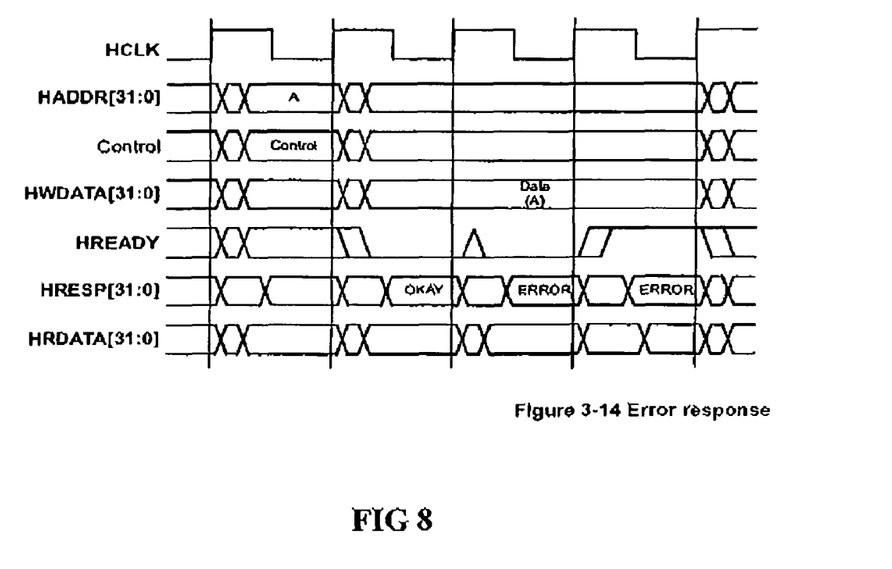
FIG. 8 is a sequence diagram of error response of AMBA AHB bus.

FIG. 8 is a sequence diagram of error response of AMBA AHB bus, it is shown that HREPS is the ERROR response of two clock periods, and the time when HREADY signal is low is also two clock periods.

Figure 9:
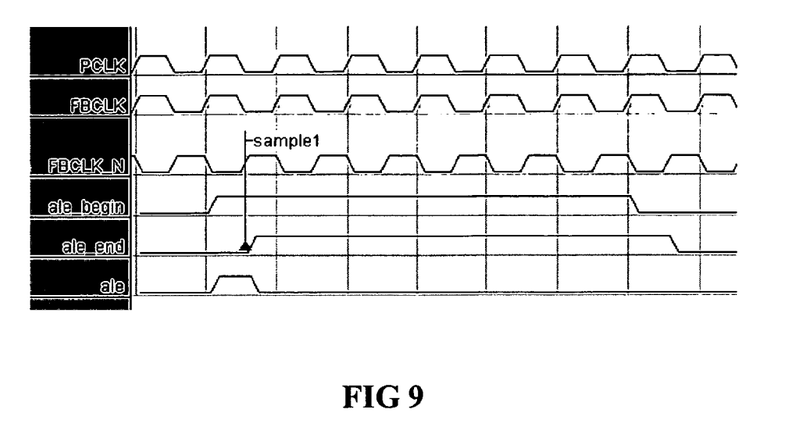
FIG. 9 is a sequence diagram for generating the i960-like bus protocol's ALE signal according to one embodiment of the present invention which the bus interface converter capable of converting AMBA AHB bus protocol into i960-like bus protocol.

FIG. 9 is a sequence diagram illustrating that the bus interface converter capable of converting AMBA AHB bus protocol into i960-like bus protocol according to one embodiment of the present invention carries out the production of the ALE signal of i960-like bus protocol. FBCLK_N is a clock having opposite phase to that of FBCLK (FBCLK clock and i960-like bus clock are synchronous), this figure illustrates the situation where the AMBA AHB bus interface clock and i960-like bus interface clock are synchronous.

Figure 10:
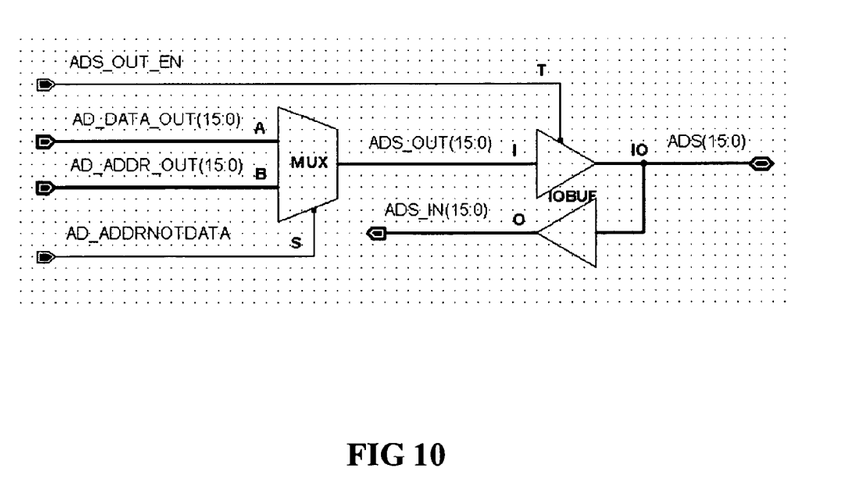
FIG. 10 is a circuit diagram for the address and data signal multiplexing bus, input and output signal multiplexing bus of the bus interface converter capable of converting AMBA AHB bus protocol into i960-like bus protocol according to one embodiment of the present invention.

FIG. 10 is a circuit diagram of the address and data signal multiplexing bus, input and output signal multiplexing bus of the bus interface converter capable of converting AMBA AHB bus protocol into i960-like bus protocol according to one embodiment of the present invention. Wherein MUX is a selector group choosing one from two, performing the multiplexing between the output address bus and output data bus, and this part of logic is completed in the bus multiplexing module 712 of i960-like interface as shown in FIG. 7; IOBUF is a dual-direction tri-state buffer group, serving to multiplex the output bus signal ADS_OUT and the import bus signal ADS_IN into the tri-state dual-direction address data bus signal ADS of i960-like bus protocol, and because of including high-impedance state, this part of logic is completed in the top module 608.

While the description of the bus interface converter for converting AMBA AHB bus protocol into i960-like bus protocol according to the present invention has been given with respect to a preferred embodiment, it is not to be constructed in a limited sense. Variations and modification within the spirit and scope of this invention will occur to those skilled in the art. Thus the present invention is not limited to these embodiments. Reference is made to the appended claims for a definition of the invention.

What is claimed is:

1. A bus interface converter capable of converting an AMBA AHB bus protocol into an i960-like bus protocol, comprising:
    an AHB interface for accomplishing interface processing for the AMBA AHB bus protocol;
    an i960-like interface for accomplishing interface processing for the i960-like bus protocol; and
    a main controller for accomplishing bus protocol conversion between the AHB interface and the i960-like interface;
    wherein, the AHB interface comprising:
        an AHB bus signal register module for accomplishing judgment and register for control signal from an AMBA AHB bus; and
        an AHB bus signal response module for generating corresponding response indicating signal of the AMBA AHB bus protocol;
    the i960-like interface comprising:
        a bus interface multiplexing request module for generating bus interface multiplexing request signal; and
        a bus multiplexing module for accomplishing the multiplexing between an address bus for outputting from an AHB to an i960-like and a data bus for outputting from an AHB to an i960-like;
    wherein a clock of the i960-like interface can be set to be in a normal mode or a low-power mode; in the low-power mode, the clock of the i960-like interface is dynamically controlled by the bus interface multiplexing request signal sent by the bus interface multiplexing request module; when there is communication between the AHB bus and an i960-like bus, the clock of the i960-like interface is valid; and when there is no communication between the AHB bus and the i960-like bus, the clock of the i960-like interface is set high to suspend.

2. The converter according to claim 1, wherein the AHB bus signal register module further comprises:

an AHB bus write buffer module for performing buffering to write data and a write address from the AHB bus.

3. The converter according to claim 2, wherein the AHB bus write buffer module comprises two buffering fields including an address field and a data field.

4. The converter according to claim 2, wherein the AHB bus write buffer module has an enabling port, and can set the size of buffering fields for the address field and the data field of the AHB bus write buffer module via the AHB bus.

5. The converter according to claim 1, wherein the AHB bus signal response module serves to generate AMBA AHB bus feedback signals including HREADYout and HRESP.

6. The converter according to claim 1, wherein the i960-like interface has a request and response function of an accessing outside shared bus, which can be connected to a bus interface multiplexing controller and then connected to the i960-like bus after bus multiplexing.

7. The converter according to claim 1, wherein the i960-like interface can be directly connected to the i960-like bus.

8. The converter according to claim 1, wherein the bus interface multiplexing request module determines whether to send the bus interface multiplexing request signal to the bus interface unit based on a state indicating signal from the main controller, and determines whether to stop sending the bus interface multiplexing request signal to the bus interface multiplexing controller based on a response signal from the i960-like bus.

9. The converter according to claim 1, wherein an address and data multiplexing output bus of the bus multiplexing module is connected to a top interconnected logic module, and multiplexed with an ADS-IN signal into a tri-state dual-direction address data bus signal through a tri-state gate.

10. The converter according to claim 1, wherein the main controller has two clocks being synchronous with an AHB bus clock and an i960-like bus clock respectively.

11. The converter according to claim 1, wherein a clock frequency of the AHB bus may be N times of that of the i960-like bus, where N is a natural number no less than 1.

12. The converter according to claim 1, wherein the main controller has a state machine, which serves to indicate the current state of the main controller, and the state machine has three states: idle, read and write.

* * * * *